United States Patent [19]

Taylor

[11] Patent Number: 4,990,762
[45] Date of Patent: Feb. 5, 1991

[54] LASER BEAM PHASE MEASUREMENT AND CONTROL SYSTEM

[75] Inventor: Leonard S. Taylor, Silver Spring, Md.

[73] Assignee: The United States of America as represented by the Secretary of the Navy, Washington, D.C.

[21] Appl. No.: 332,796

[22] Filed: Dec. 21, 1981

[51] Int. Cl.⁵ ............................................... G01J 1/20
[52] U.S. Cl. .................................... 250/201.8; 356/345
[58] Field of Search ....................... 250/201, 205, 201.8; 356/138, 345; 455/615

[56] References Cited

U.S. PATENT DOCUMENTS

| | | | |
|---|---|---|---|
| 3,469,924 | 9/1969 | Haswell | 356/345 |
| 3,915,575 | 10/1975 | Sick | 356/152 |
| 4,265,539 | 5/1981 | Gafford | 356/345 |

Primary Examiner—David C. Nelms
Attorney, Agent, or Firm—Kenneth E. Walden; John G. Wynn

[57] ABSTRACT

An intensity measurement system portion of a phase measurement and control system permits rapid measurement of the laser field intensity profile in the transverse plane of a main laser beam. The intensity measurement system portion measures the laser field intensity profile by measuring the intensities of a plurality of beam samples of the main laser beam. The aforementioned measured intensities are processed in a phase computer according to a predetermined algorithm to generate drive current profiles in response to the phase variations of the main laser beam. These drive currents drive a dither-control amplifier which causes electromechanical movement of a plurality of mirror segments of a multi-dither mirror to correct for the random phase variations in the main laser beam. An important consideration in configuring the intensity measurement system portion of the present invention is the use of a reflecting stop and a reflecting stop detector combination to obstruct one of the plurality of beam samples and to measure the intensity thereof at the reflecting stop position.

5 Claims, 1 Drawing Sheet

LASER BEAM PHASE MEASUREMENT AND CONTROL SYSTEM

BACKGROUND OF THE INVENTION

1. Field of the Invention

The present invention relates to a phase measurement and control system for aiming and focusing a laser beam in response to the time-varying phase thereof, but more specifically, it relates to a system for measuring the transverse phase pattern of the laser beam using laser field intensity measurements.

2. Description of the Prior Art

It is known that the spatial phase variations of laser beams are currently measured using scanning interferometers. However, scanning interferometers are expensive and difficult to adjust and maintain under field conditions outside a laboratory environment. Additionally, the operations of these instruments are compromised by temporal variations of phase of the entire laser beam. Also, purely computational techniques for determining the phase distribution of the laser beam have produced ambiguous results.

Accurate measurements of laser beam phase variations in a transverse plane are required, for example, in adaptative transmission systems in order to better aim and focus the laser beam in hostile environments. In these systems, laser beam degradation is avoided and beam aiming and focusing is generally accomplished by electro-mechanical variations of a plurality of mirror segments of a multi-dither mirror in order to correct for laser spatial phase variations. Since these variations change with time, the multi-dither mirror must be continuously adjusted in response to the time-varying phase of the laser beam.

The prior art, as indicated hereinabove, include advances in spatial phase measurements of a laser beam. However, insofar as can be determined, no prior art phase measurement system incorporates all of the features and advantages of the present invention.

OBJECTS OF THE INVENTION

Accordingly, an important object of the present invention is to measure the time-varying phase profile of a laser beam in an improved manner.

Another object of the present invention is to continuously adjust the curvature of a multi-dither mirror in response to the time-varying phase of the laser beam to improve the control of the aiming and focusing thereof.

Still another object of the present invention is to measure the transverse phase patterns of the laser beam using intensity measurement techniques in an improved manner.

A further object of the present invention is to configure a system for measuring the time-varying phase of the laser beam in a plane transverse thereto without compromising system costs and maintainability.

SUMMARY OF THE INVENTION

In accordance with the above stated objects, other objects, features and advantages, the present invention has as a primary purpose to rapidly measure the optical phase distribution in the transverse plane of a laser beam. The foregoing is accomplished without relying on purely computational algorithms which have produced ambiguous results.

The essence of the present invention is in the use of a reflecting stop to both obstruct the laser field and permit intensity measurements at the reflecting stop.

The primary purpose of the present invention is carried out by configuring a phase measurement and control system including a laser device for generating a main beam and an intensity measurement portion in combination with a phase computer for measuring the phase variations of the main beam in a plane transverse thereto.

The intensity measurement portion of the phase measurement and control system comprises an array of detectors for measuring the far-field intensity pattern of the laser beam in a transverse plane. The laser is effectively removed to infinity by measuring the intensity in the focal plane of a lens. Also included is an array of detectors for measuring the far-field intensity of the laser beam in the presence of a reflecting stop. A reflecting surface on the stop directs a portion of the laser beam to a stop detector. A partial array of detectors is also provided to check the orientation of the laser beam for comparison with a computed phase distribution. The intensity distribution from the aforementioned detectors is processed by the phase computer according to a predetermined algorithm resulting in phase profile information.

The phase measurement and control system further includes a dither-control amplifier which interfaces between the phase computer and a multi-dither mirror having a plurality of mirror segments The dither-control amplifier converts the phase profile information from the phase computer into a corresponding drive current profile. Thus, each of the plurality of mirror segments is controlled in response to phase variations of the main laser beam such that the curvature of the multi-dither mirror changes thereby controlling the aiming and focusing of an outgoing portion of the main laser beam.

BRIEF DESCRIPTION OF THE DRAWINGS

The previously stated objects, other objects, features and advantages of the present invention will be apparent from the following more particular description of the preferred embodiment as illustrated in the accompanying drawings, in which.

DESCRIPTION OF THE PREFERRED EMBODIMENT

Figure 1:
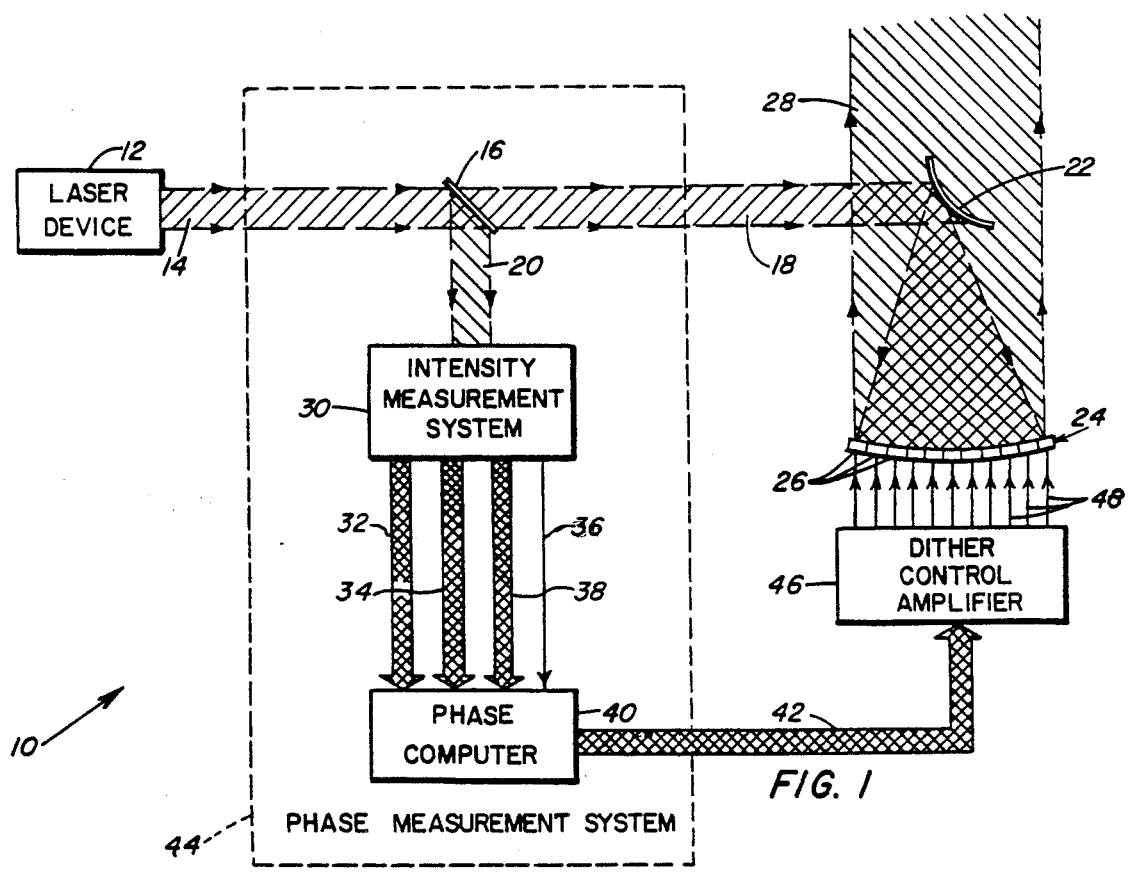
FIG. 1 is a schematic representation of a phase measurement and control system, according to the present invention, depicting, inter alia, an intensity measurement system portion for measuring the intensity profile of a main laser beam in a plane transverse thereto, and an arrangement for controlling the aiming and focusing of an outgoing portion of the main laser beam in response to the phase variations therein as determined from the intensity profile.

FIG. 1 shows an embodiment of a phase measurement and control system 10, including a laser device 12 for generating a main laser beam 14, in which the present invention is employed to, inter alia, measure the phase variations of main laser beam 14 in a plane transverse thereto. Phase measurement and control system 10 comprises a main laser beam splitter 16 for dividing main laser beam 14 into an outgoing main laser beam 18 and a main laser beam sample 20. A beam spreader 22 is disposed symmetrically on the optical axis with respect to outgoing main laser beam 18. A multi-dither mirror 24 having a plurality of mirror segments 26 co-acts with beam spreader 22 so as to spread out outgoing main laser beam 18 onto plurality of mirror segments 26 of multi-dither mirror 24. Each one of plurality of mirror segments 26 is capable of individual control and can cause the curvature of multi-dither mirror 24 to vary as a function of the time-varying phase of main laser beam 14. Thus, outgoing main laser beam 16 is formed into an aimed and focused outgoing main laser beam 28 which, in turn, is transmitted to a receiver or target (not shown).

Still referring to FIG. 1, intensity measurement system 30 is disposed in the path of main laser beam sample 20 for measuring the laser field intensity profiles of main laser beam 14 in the plane transverse thereto after further processing. The field intensity profile information, via unobstructed-far-field intensity bus 32, obstructed-far-field intensity bus 34, reflecting stop intensity line 36, and near-field intensity bus 38, drives a phase computer 40. Phase computer 40, operating according to a predetermined algorithm, processes the field intensity profile information into a plurality of drive currents or voltages indicative of the time-varying phase profile of main laser beam 14. These currents or voltages are outputted from phase computer 40 onto phase computer output bus 42 on to a dither-control amplifier 46. As shown, the aforementioned main laser beam splitter 16, intensity measurement system 30, and phase computer 40 comprise a phase measurement system 44 portion of phase measurement and control system 10. Dither-control amplifier 46 is operatively connected to plurality of mirror segments 26 via a plurality of corresponding dither-control amplifier output lines 48. Hence, in response to the phase variations of main laser beam 14, the curvature of multi-dither mirror 24 changes since dither-control amplifier 46 causes electromechanical motion of plurality of mirror segments 26 thereby correcting for the random phase variations of main laser beam 14. These multi-dither mirror 24 changes control the aiming and focusing of outgoing main laser beam 28 onto a receiver or target (not shown).

STATEMENT OF THE OPERATION

Figure 2:
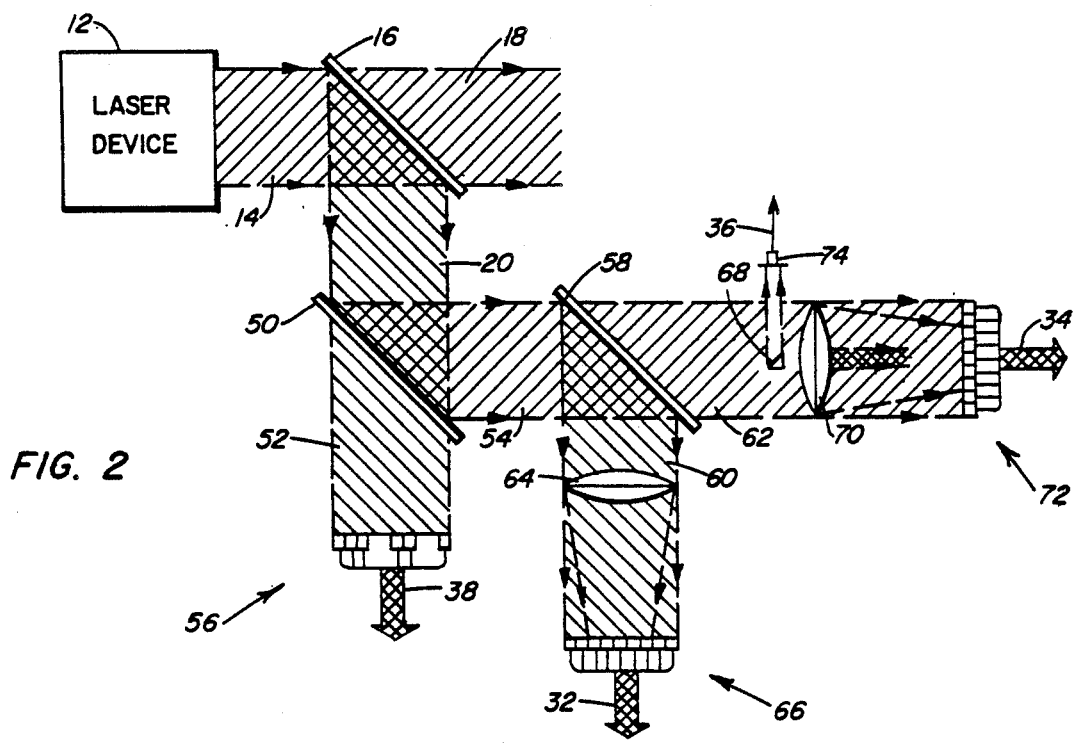
FIG. 2 is a schematic representation of the intensity measurement system portion of FIG. 1 illustrating how the intensity profile of the main laser beam is determined.

Details of the operation, according to a preferred embodiment of the present invention, are explained in conjunction with FIGS. 1 and 2 viewed concurrently. Referring primarily to FIG. 2, intensity measurement system 30 of FIG. 1 is shown in detail. Main laser beam splitter 16 deflects main laser beam sample 20 into a near-field laser beam splitter 50 where it is further split into a near-field laser beam sample 52 and an outgoing near-field laser beam sample 54. Near-field laser beam sample 52 is transmitted to a partial array of near-field detectors 56 for comparison, in turn, with the computed pattern of laser field intensities to resolve ambiguity in the predetermined algorithm.

Outgoing near-field laser beam sample 54 is split by a far-field beam splitter 58 into an unobstructed-far-field beam sample 60 and an obstructed-far-field beam sample 62. Unobstructed-far-field beam sample 60 is focused by an unobstructed-far-field lens 64 onto a two-dimensional array of unobstructed-far-field detectors 66 placed at the focal plane of unobstructed-far-field lens 64. The transverse intensity pattern, $I_{ff}$, on the aforementioned detectors is the magnitude-squared of the Fourier transform of the transverse (x, y) laser field, u(x, y). Obstructed-far-field beam sample 62 is obstructed and partially reflected by a reflecting stop 68 disposed at a central position as shown. Obstructed-far-field beam sample 62 is then passed through an obstructed-far-field lens 70. The transverse intensity pattern, $I_{of}$, of obstructed-far field beam sample 62 is measured at the focal plane of the aforementioned lens by a two-dimensional array of obstructed-far-field detectors 72. Thus, the transverse intensity pattern, $I_{of}$, on these detectors is the magnitude-squared of the Fourier transform of the abstracted laser field $[u(x,y)-u(x_o,y_o) \delta (x-x_o, y-y_o)]$, where $(x_o, y_o)$ is the transverse position of reflecting stop 68 in obstructed-far-field beam sample 62.

A single reflecting stop detector 74 measures the intensity, $I_{SD}$, of the laser field, $u(x_o,y_o)$, at the position of reflecting stop 68. The magnitude of the intensity, $I_{SD}$, is then conveyed electrically via reflecting stop intensity line 36 to phase computer 40 (see FIG. 1). The intensity patterns $I_{ff}$ and $I_{of}$, of the aforementioned arrays of detectors 66 and 72 respectively, are conveyed electrically via corresponding unobstructed-far-field intensity bus 32 and obstructed-far-field intensity bus 34 to phase computer 40. The number of elements in both arrays of detectors is matched to the number of plurality of mirror segments 26 of multi-dither mirror 24 available for optical control, for example a 36×36 matrix.

Phase computer 40 operates according to the following predetermined algorithm: the discrete data on unobstructed-far-field intensity bus 32, obstructed-far-field intensity bus 34, and reflecting stop intensity line 36 is treated digitally and the phase of the laser far-field is computed in phase computer 40 as $\Psi(x,y) = \pm \cos^{-1} \{[I_{ff}(x,y)+I_{SD}-I_{of}(x,y)]/2I_{SD}^{\frac{1}{2}}I_{ff}^{\frac{1}{2}}(x,y)\}$. The laser field u(x,y) and its twin field $u_T$, are now reconstructed as $F^{-1}\{I_{ff}^{\frac{1}{2}}(x,y) \exp [j\Psi(x,y)]\}$, and $F^{-1}\{I_{ff}^{\frac{1}{2}}(x,y) \exp [-j\Psi(x,y)]\}$. The corresponding intensities are $|F^{-1}\{I_{ff}^{\frac{1}{2}}(x,y) \exp [j\Psi(x,y)]\}|^2$, and $|F^{-1}\{I_{ff}^{\frac{1}{2}}(x,y) \exp [-j\Psi(x,y)]\}|^2$. These intensities are then compared in phase computer 40 with the intensity pattern observed on partial array near-field detectors 56 to determine the correct sign of the phase. The correct phase result is then conveyed via phase computer output bus 42 to dither-control amplifier 46. The number of detector elements needed for near-field detectors 56 varies with the expected asymmetry of the phase profile. For highly asymmetric patterns only a few detectors are required, for example six to ten.

To those skilled in the art, modifications and variations of the present invention are possible in light of the above teachings. It is therefore to be understood that the present invention can be practiced otherwise as specifically described herein and still be within the spirit and scope of the appended claims.

I claim:

1. A phase measurement and control system, including a laser device for generating a main laser beam, for measuring the phase variations of the main laser beam in a plane transverse thereto, and for controlling the aiming and focusing of an outgoing main laser beam in response to the phase variations in the main laser beam to correct for the time-varying phase thereof, which comprises:

a main laser beam splitter disposed transverse to the main laser beam for dividing the main laser beam into a main laser beam sample and the outgoing main laser beam;

a beam spreader disposed symmetrically and on the optical axis of the outgoing main laser beam;

a multi-dither mirror having a plurality of mirror segments being capable of individual control for varying the curvature of said multi-dither mirror, said beam spreader being symmetrically deposed on the optical axis of said multi-dither mirror so as to spread out the outgoing main laser beam onto said multi-dither mirror for forming an aimed and focused outgoing main beam;

an intensity measurement system disposed in the path of the main laser beam sample for measuring field intensity profile information of the main laser beam in the plane transverse thereto;

a phase computer operatively connected to said intensity measurement system for processing the field intensity profile information into a drive current profile indicative of the time-varying phase profile of the main laser beam, said phase computer operating according to a predetermined algorithm; and a dither control device interfacing said phase computer via a phase profile bus and said multi-dither mirror via a plurality of mirror segments control lines for converting the phase profile information into a corresponding drive current profile, each of said plurality of mirror segments control lines being operatively connected to corresponding ones of said plurality of mirror segments of said multi-dither mirror, such that in response to phase variations of the main laser beam, the curvature of said multi-dither mirror changes thereby controlling the aiming and focusing of the outgoing main laser beam.

2. A phase measurement and control system according to claim 1 wherein said intensity measurement system further comprises:

a near-field beam splitter disposed transverse to the main laser beam sample for dividing the main laser beam sample into a near-field laser beam sample and an outgoing near-field laser beam sample;

a far-field laser beam splitter disposed transverse to the outgoing near-field laser beam sample for dividing the outgoing near-field laser beam sample into an unobstructed-far-field laser beam sample and an obstructed-far-field laser beam sample;

an array of unobstructed-far-field detectors disposed normal to the unobstructed-far-field laser beam sample for measuring the unobstructed-far-field intensity of the main laser beam in the transverse plane thereto;

an unobstructed-far-field lens disposed between said far-field laser beam splitter and said array of unobstructed-far-field detectors in the path of the unobstructed-far-field laser beam sample such that said array of unobstructed-far-field detectors are disposed in the focal plane of said unobstructed-far-field lens thereby effectively removing to infinity the main laser beam of said laser device;

a reflecting stop disposed transverse to the obstructed-far-field laser beam sample for obstructing and diverting a portion thereof in a plane normal thereto;

an array of obstructed-far-field detectors disposed normal to the obstructed-far-field laser beam sample for measuring the obstructed-far-field intensity of the main laser beam in the transverse plan thereof and in the presence of said reflecting stop;

an obstructed-far-field lens disposed between said reflecting stop and said array of obstructed-far-field detectors in the path of the obstructed-far-field laser beam sample such that said array of obstructed-far-field detectors are disposed in the focal plane of said obstructed-far-field lens thereby effectively removing to infinity the main laser beam of said laser device;

a reflecting stop detector disposed normal to a reflecting surface of said reflecting stop for measuring the field intensity of the obstructed-far-field laser beam sample at said reflecting stop position; and a partial array of laser field detectors disposed normal to the near-field laser beam sample for measuring the laser field intensity of the main laser beam in the plane transverse thereto to check the orientation thereof for comparison with the processed field intensity profile information to determine the correct sign thereof.

3. A phase measurement and control system according to claim 2 wherein the number of elements in said array of unobstructed-far-field detectors or said array of obstructed-far-field detectors corresponds to the number of said plurality of mirror segments of said multi-dither mirror available for optical control.

4. A phase measurement system, including a laser device for generating a main laser beam, for measuring the phase variations of the main laser beam in a plane transverse thereto, which comprises:

a main laser beam splitter disposed transverse to the main laser beam for dividing the main laser beam into a main laser beam sample and an outgoing main laser beam;

a near-field laser beam splitter disposed transverse to the main laser beam sample for dividing the main laser beam sample into a near-field laser beam sample and an outgoing near-field laser beam sample;

a far-field laser beam splitter disposed transverse to the outgoing near-field laser beam sample for dividing the outgoing near-field laser beam sample into an unobstructed-far-field laser beam sample and an obstructed-far-field laser beam sample;

an array of unobstructed-far-field detectors disposed normal to the unobstructed-far-field laser beam sample for measuring the unobstructed-far-field intensity of the main laser beam in the transverse plane thereto;

an unobstructed-far-field lens disposed between said far-field laser beam splitter and said array of unobstructed-far-field detectors in the path of the unobstructed-far-field laser beam sample such that said array of unobstructed-far-field detectors are disposed in the focal plane of said unobstructed-far-field lens thereby effectively removing to infinity the main laser beam of said laser device;

a reflecting stop disposed transverse to the obstructed far-field laser beam sample for obstructing and diverting a portion thereof in a plane normal thereto;

an array of obstructed-far-field detectors disposed normal to the obstructed-far-field laser beam sample for measuring the obstructed-far-field intensity of the main laser beam in the transverse plane thereof and in the present of said reflecting stop;

an obstructed-far-field lens disposed between said reflecting stop and said array of obstructed-far-field detectors in the path of the obstructed-farfield laser beam sample such that said array of obstructed-far-field detectors are disposed in the focal plane of said obstructed-far-field lens thereby effectively removing to infinity the main laser beam of said laser device;

a reflecting stop detector disposed normal to a reflecting surface of said reflecting stop for measuring the field intensity of the obstructed-far-field laser beam sample at said reflecting stop position;

a partial array of laser field detectors disposed normal to the near-field laser beam sample for measuring the laser field intensity of the main laser beam in the plane transverse thereto to check the orientation thereof for comparison with field intensity profile information to be processed to determine the correct sign thereof; and a phase computer operatively connected to said array of unobstructed-far-field detectors, said array of obstructed-far-field detectors, said reflecting stop detector, and said partial array of laser field detectors for processing the field intensity profile information into a drive current profile indicative of the time-varying phase profile of the main laser beam, said phase computer operating according to a predetermined algorithm.

5. An intensity measurement system, including a laser device for generating a main laser beam, for measuring the field intensity profile in the transverse plane of the main laser beam, which comprises:

a near-field beam splitter disposed transverse to the main laser beam sample for dividing the main laser beam sample into a near-field laser beam sample and an outgoing near-field laser beam sample;

a far-field laser beam splitter disposed transverse to the outgoing near-field laser beam sample for dividing the outgoing near-field laser beam sample into an unobstructed-far-field laser beam sample and an obstructed-far-field laser beam sample;

an array of unobstructed-far-field detectors disposed normal to the unobstructed-far-field laser beam sample for measuring the unobstructed-far-field intensity of the main laser beam in the transverse plane thereto;

an unobstructed-far-field lens disposed between said far-field laser beam splitter and said array of unobstructed-far-field detectors in the path of the unobstructed-far-field laser beam sample such that said array of unobstructed-far-field detectors are disposed in the focal plane of said unobstructed-far-field lens thereby effectively removing to infinity the main laser beam of said laser device;

a reflecting stop disposed transverse to the obstructed-far-field laser beam sample for obstructing and diverting a portion thereof in a plane normal thereto;

an array of obstructed-far-field detectors disposed normal to the obstructed-far-field laser beam sample for measuring the obstructed-far-field intensity of the main laser beam in the transverse plan thereof and in the presence of said reflecting stop;

an obstructed-far-field lens disposed between said reflecting stop and said array of obstructed-far-field detectors in the path of the obstructed-far-field laser beam sample such that said array of obstructed-far-field detectors are disposed in the focal plane of said obstructed-far-field lens thereby effective removing to infinity the main laser beam of said laser device;

a reflecting stop detector disposed normal to a reflecting surface of said reflecting stop for measuring the field intensity of the obstructed-far-field laser beam sample at said reflecting stop position; and a partial array of laser field detectors disposed normal to the near-field laser beam sample for measuring the laser field intensity of the main laser beam in the plane transverse thereto to check the orientation thereof for comparison with the processed field intensity profile information to determine the correct sign thereof.

* * * * *